US012808408B2

(12) United States Patent
Buettner et al.

(10) Patent No.: US 12,808,408 B2
(45) Date of Patent: Nov. 24, 2026

(54) PLAIN BEARING RING AND METHOD FOR PRODUCING A PLAIN BEARING RING

(71) Applicant: AKTIEBOLAGET SKF, Gothenburg (SE)

(72) Inventors: Martin Buettner, Schwarzach (DE); Andreas Vierling, Schwebheim (DE); Frank Henninger, Grafenrheinfeld (DE)

(73) Assignee: AKTIEBOLAGET SKF, Gothenburg (SE)

( * ) Notice: Subject to any disclaimer, the term of this patent is extended or adjusted under 35 U.S.C. 154(b) by 10 days.

(21) Appl. No.: 18/517,858

(22) Filed: Nov. 22, 2023

(65) Prior Publication Data

US 2024/0183397 A1 Jun. 6, 2024

(30) Foreign Application Priority Data

Dec. 2, 2022 (DE) ......................... 102022213022.7

(51) Int. Cl.
*F16C 33/12* (2006.01)
*F16C 17/02* (2006.01)

(52) U.S. Cl.
CPC ............ *F16C 33/122* (2013.01); *F16C 17/02* (2013.01)

(58) Field of Classification Search
CPC .............. F16C 2223/46; F16C 2202/08; F16C 2240/60; F16C 33/125; F16C 33/122; F16C 33/06; F16C 23/043–046
See application file for complete search history.

(56) References Cited

U.S. PATENT DOCUMENTS

| | | | | |
|---|---|---|---|---|
| 4,123,122 | A * | 10/1978 | Gabrielson | F16C 33/24 384/902 |
| 4,758,404 | A | 7/1988 | Muto | |
| 5,137,792 | A | 8/1992 | Hodes et al. | |
| 2008/0206087 | A1* | 8/2008 | Fujita | C22C 21/14 419/8 |
| 2009/0232431 | A1 | 9/2009 | Roeingh et al. | |
| 2018/0073113 | A1* | 3/2018 | Sherif | F16C 33/62 |
| 2018/0335084 | A1 | 11/2018 | Bell | |
| 2020/0408243 | A1* | 12/2020 | Abdul | F16C 11/0628 |
| 2022/0025926 | A1* | 1/2022 | Kursawe | F16C 23/045 |

(Continued)

FOREIGN PATENT DOCUMENTS

| | | | |
|---|---|---|---|
| DE | 3636641 | A1 | 5/1987 |
| DE | 102006023384 | A1 | 11/2007 |

(Continued)

OTHER PUBLICATIONS

Extended European Search Report from the European Patent Office dispatched Feb. 29, 2024 in related application No. 23213283.7, including European Search Opinion.

(Continued)

*Primary Examiner* — James Pilkington
*Assistant Examiner* — Aimee Tran Nguyen
(74) *Attorney, Agent, or Firm* — J-TEK LAW PLLC; Scott T. Wakeman; Mark A. Ussai

(57) ABSTRACT

A plain bearing ring is formed from a metallic base material and a laser-clad sliding layer on the base material, the base material having a higher elastic limit than a material of the sliding layer. Also a plain bearing including at least one such plain bearing ring and a method of forming the plain bearing ring.

18 Claims, 2 Drawing Sheets

(56) References Cited

U.S. PATENT DOCUMENTS

| | | | | |
|---|---|---|---|---|
| 2022/0381291 | A1* | 12/2022 | Zhou | F16C 17/246 |
| 2023/0003255 | A1 | 1/2023 | Hentschke et al. | |
| 2023/0113380 | A1 | 4/2023 | Landrieve | |
| 2024/0255027 | A1* | 8/2024 | Andersson | F16C 33/06 |

FOREIGN PATENT DOCUMENTS

| | | | |
|---|---|---|---|
| DE | 102006023397 | A1 | 11/2007 |
| DE | 102018119504 | A1 | 2/2020 |
| DE | 102019131591 | A1 | 5/2021 |
| DE | 102022204689 | A1 | 11/2023 |
| WO | 8910434 | A1 | 11/1989 |
| WO | 2022253763 | A1 | 12/2022 |

OTHER PUBLICATIONS

Communication from the German Patent Office dated Jan. 30, 2023 in related German application No. 10 2022 213 022.7, and translation thereof.

* cited by examiner

PLAIN BEARING RING AND METHOD FOR PRODUCING A PLAIN BEARING RING

CROSS-REFERENCE

This application claims priority to German patent application no. 10 2022 213 022.7 filed on Dec. 2, 2022, the contents of which are fully incorporated herein by reference.

TECHNOLOGICAL FIELD

The present disclosure is directed to a plain bearing ring having a cladded surface, a plain bearing including the plain bearing ring and a method of producing the plain bearing ring.

BACKGROUND

Plain bearings can be used in various technical spheres, with different requirements being imposed on these plain bearings, for example in terms of load rating or load-bearing capacity, depending on the sphere of application. The load rating defines the force or load that can be absorbed by a plain bearing before it is permanently damaged. Among other things, in the field of hydraulic steel construction, e.g. the mounting of gates in dams and sluices, the requirement imposed on the (quasi-)static load-bearing capacity, i.e. the maximum loading of a plain bearing, is very exacting in order to ensure safe use even after earthquakes, etc.

Until now, plain bearings formed of monolithic rings, i.e. rings made of a solid material, have often been used. The solid material of at least one of the rings is a sliding material in order to ensure the slidability of the rings with respect to one another. For example, bronze or other copper alloys can be used for this purpose. However, bronze, for example, is a material that often meets customer requirements for the load-bearing capacity of plain bearings only to a limited extent, especially in the field of hydraulic steel construction. The demand imposed on the load-bearing capacity of such plain bearings overloads the elastic limit of such a bronze material. The elastic limit defines the value of the mechanical stress, upon the exceeding of which plastic deformation occurs. The load-bearing capacity or load rating required in various spheres of application (e.g. hydraulic steel construction, steel industry, oil and gas industry, mining) where high load-bearing capacity, corrosion resistance or contamination resistance is required would, however, lead to plastic deformation of a bronze ring, as it has been used to date, at the corresponding maximum force. Such plastic deformation may, for example, lead to a reduced bearing operating time due to losses of performance or possibly failures of the bearings.

SUMMARY

It is therefore an aspect of the present disclosure to provide a plain bearing, which provides low plastic deformation and good slidability with a simultaneously high load rating.

The disclosed plain bearing ring has a base material and a layer applied to the base material. In order to now provide a more highly loadable plain bearing ring compared to previous plain bearing rings, which gives the plain bearing a higher load rating or load-bearing capacity and at the same time provides good sliding properties, the base material used is a metallic material with a higher elastic limit than the material of the layer applied to the base material. Such a metallic material has a higher strength and yield strength than the material of the applied layer. For example, this can be a steel, especially steels whose strengths can be further increased by heat treatment. In this way, the plain bearing ring can have an increased load rating, e.g. compared to a monolithic ring made of a copper alloy.

In this context, a plain bearing ring is understood to mean a component which has a running surface that moves counter to a counter-running surface of another component. This may be a plain bearing ring having inner and outer rings. However, the plain bearing ring may also be a shaft, in particular hollow shaft, bushing, flange bushing or similar, which in each case has a running surface. Furthermore, the plain bearing ring can have a cylindrical running surface, but may also have spherical or other curved running surfaces. In particular, the plain bearing ring can be used in a spherical bearing, which can be in the form of a radial, inclined or axial spherical bearing. However, it should be noted that the plain bearing ring is not restricted to the specifically mentioned embodiments, but that each component can be provided with a running surface, as is defined above.

In order to ensure not only a sufficient load rating, but also good slidability of the plain bearing ring, the applied layer is a laser-clad layer. Such a laser-clad layer represents a reliable, inter-metallic connection between the applied layer and the base material. In laser deposition welding or laser cladding, a flat metal bond is produced between the two materials, i.e. the base material and the applied layer. The base material is heated by a laser and melted. At the same time, an inert gas mixed with fine powder or wire material, the material of the layer to be applied, is supplied (Directed Energy Deposition (DED) method). At the heated point, the powder or wire material melts and bonds with the base material. Laser cladding, in which the material of the layer is melted onto the base material, eliminates the need for additional coatings to improve adhesion, such as copper or nickel coatings, as is the case with galvanic coatings.

Since a metal which has a higher elastic limit than the material of the laser-clad layer is used as the base material, a high load rating or load-bearing capacity of the plain bearing ring overall can be provided. This enables the load rating of the entire plain bearing ring to be increased beyond the elastic limit of the laser-clad layer.

The laser-clad layer creates a secure, permanent connection between the laser-clad layer and the base material. Furthermore, by using the base material with a higher elastic limit, irreversible deformation of the entire plain bearing ring is significantly reduced or takes place within the permissible load rating range only in the laser-clad layer. Although such a deformation of the laser-clad layer may reduce the tribological performance under marginal load conditions, the risk of a safety-related failure or malfunction due to strong irreversible ring deformation or bearing deformation is significantly reduced by the base material. At the same time, in addition to the increased load-bearing capacity because of the combination of base material and laser-clad layer, the laser-clad layer means that the friction can be reduced and/or the plain bearing ring can be protected from corrosion and/or wear, as is explained in more detail below. Owing to the higher load-bearing capacity, the plain bearing ring, or a plain bearing in which the plain bearing ring is installed, may be, for example, smaller than was possible in the case of previous plain bearing rings.

According to one embodiment, the laser-clad layer is a friction-reducing layer, a corrosion protection layer and/or a wear protection layer. If the laser-clad layer is applied only to the raceway of the plain bearing ring, it can be used in particular as a sliding layer. Preferably, in such a case, it is formed from a material that can fulfil the functionality of a sliding layer, such as a copper alloy. In this way, the sliding function of the plain bearing ring can be increased in comparison to a plain bearing ring made only of the base material. Instead or in addition to the function of a sliding layer, the laser-clad layer can also be used to protect against corrosion and/or wear, either only in the region of the raceway or in the region of the entire bearing ring, especially if the laser-clad layer is applied to the entire surface of the sliding bearing ring, as explained below.

According to a further embodiment, the laser-clad layer has friction-reducing and/or wear-reducing fillers. For example, additional friction- and wear-reducing fillers can be added to the material of the laser-clad layer in the course of the cladding process. These fillers can be embedded in the laser-clad layer or applied to the laser-clad layer flat or at least flat over a proportion of the area. The fillers may include organic fillers such as polytetrafluoroethylene (PTFE), polyether ether ketone (PEEK), polyamide imide (PAI), polyimide (PI) and/or Polybenzimidazole (PBI), inorganic fillers such as molybdenum disulfide ($MoS_2$), graphite, carbon nanotubes, graphene, tungsten disulfide ($WS_2$), hexagonal boron nitride, and/or friction-reducing metallic or semi-metallic alloy elements such as Sn, In, Bi, Pb, Ag, Sb, either alone or in combination or the like. In addition, lubricants, dry sliding materials or the like can be introduced in other known ways, for example by inserting dry sliding materials into bores (e.g. solid lubricant plugs) or other structures, e.g. grooves. In this way, the laser-clad layer can not only improve, for example, the slidability of the plain bearing ring, while at the same time a high load rating is ensured by the base material, but the laser-clad layer can also fulfil further additional functions, such as an additional friction reduction or wear reduction by such fillers.

Since the material from which the laser-clad layer is made can be mixed with friction- and/or wear-reducing fillers directly during the deposition welding, the effort and/or the costs for the introduction of such a lubricant, especially with dry sliding materials, is reduced. In particular, the dry sliding material can be introduced here directly into the metal powder or the wire material, which is welded onto the base material of the plain bearing ring during the deposition welding. An additional step is not necessary here.

The plain bearing ring can be subjected to further processes, such as a coating, both before the application of the laser-clad layer and after the application of the laser-clad layer, in order to achieve a desired component property, such as additional corrosion protection or the like. For example, it is possible to provide further layers under and/or on the laser-clad layer in addition to the laser-clad layer in order to provide the plain bearing ring with further functions or properties.

The metallic material of the base material can be, for example, steel, such as tempered steel 42CrMo4+QT or rolling bearing steel 100Cr6 or higher alloyed steel with a low carbon content. In particular, the base material may be boron-alloyed steel, in particular with a boron content of 0.0008% by mass to 0.0050% by mass. Such a base material may be, for example, 27MnCrB5-2 and 33MnCrB5-2 in accordance with EN ISO 683-2 (EN ISO 683-2:2016). A boron-alloyed steel affords the advantage that relatively high hardness and strength values are made possible with a low carbon content at the same time. In addition, boron-alloyed steels typically contain little to no nickel. By dispensing with nickel, which constitutes a high cost factor, cost-effective production of the plain bearing ring is thus possible.

The metallic material of the base material can furthermore provide the advantage that it can be selected so that it is magnetizable in comparison to plain bearing rings, which have a copper alloy as the solid material. This magnetizability enables easier machining, as the plain bearing ring can be magnetically clamped, for example.

According to one embodiment, the base material has a carbon content of less than 0.37 m-%. The less carbon is contained in the base material, the easier it is to apply the sliding layer by deposition welding. A low carbon content (i.e. a carbon portion of less than 0.37%) avoids or reduces martensitic microstructure transformations, thereby reducing undesirable hardness peaks and the risk of cracking and chipping of the laser-clad layer.

According to a further embodiment, the laser-clad layer comprises a copper alloy, in particular bronze. Such a copper alloy, e.g. bronze, brass, aluminium-bronze or copper-nickel-tin (CuNiSn), constitutes a material that is particularly well suited as a sliding layer, since it has good sliding properties because of a low tendency to seize or to exhibit adhesive wear.

The layer thickness of the laser-clad layer is preferably up to a maximum of 10 mm. This layer thickness is preferably not exceeded in the applied state, i.e. without final processing, nor in the overturned or ground state. Compared to the thickness of the base material, the laser-clad layer is therefore relatively thin. This has the advantage that the high load rating, which is given to the plain bearing ring by the base material, is not affected by the laser-clad layer.

According to a further embodiment, the laser-clad layer is provided on the entire surface of the plain bearing ring. If the laser-clad layer is applied not only to the sliding surface or raceway, but also to the entire plain bearing ring, this has the advantage, for example, that corrosion protection can be provided in addition to the function of the slidability, depending on the choice of the material welded on. Since the laser-clad layer surrounds or encloses the entire base material of the plain bearing ring, the base material is completely shielded from the outside, and the laser-clad layer can protect the plain bearing ring from corrosion.

Furthermore, the laser-clad layer can be applied as a multi-layered system. In this case, the laser-clad layer may be formed by a plurality of layers, which may be formed of the same or optionally different materials. As already explained above, in addition to the laser-clad layer, additional layers which may provide further additional properties may be present below or above the laser-clad layer.

According to another aspect, a plain bearing having a plain bearing inner ring and a plain bearing outer ring is proposed. The two rings are rotatable relative to each other. At least one of the rings is formed by a plain bearing ring as described above. This has the advantage that the two rings are made of a relatively inexpensive base material, such as boron-alloyed steel or tempered steel, and a laser-clad layer of more expensive material, such as bronze, is applied to at least one of the rings. The laser-clad layer creates a stable, flat metal bond between the base material and the laser-clad layer. The sliding surface on one of the rings provides a good sliding property between the two rings, and the other ring can also be made from an inexpensive base material, such as a standard ring material 42CrMo4+QT. The base material of the sliding rings, which is in particular a metallic material with a higher elastic limit than the material of the laser-clad layer, furthermore has the advantage that, in the case of radially or axially split rings, screwing of the ring halves is reliably possible because of the more stable material.

According to a further aspect, a method for producing a plain bearing ring is proposed, wherein the plain bearing ring has a base material and a layer applied to the base material. The method furthermore comprises the step of applying the layer on the base material by laser cladding (Directed Energy Deposition (DED) method) either using wire material or with an application material in powder form), the base material being a metallic material which has a higher elastic limit than the material of the laser-clad layer.

The features and benefits described above with respect to the plain bearing ring and the plain bearing apply to the method in an analogous manner.

Further advantages and advantageous embodiments are specified in the description, the drawings and the claims. In particular, the combinations of the features specified in the description and in the drawings are purely exemplary, and therefore the features can also be present individually or in other combinations.

In the following, the invention will be described in more detail using exemplary embodiments illustrated in the drawings. The exemplary embodiments and the combinations shown in the exemplary embodiments are purely exemplary and are not intended to define the scope of protection of the invention. This is defined solely by the attached claims.

DETAILED DESCRIPTION

In the following, identical or functionally equivalent elements are identified by the same reference signs.

Figure 1:
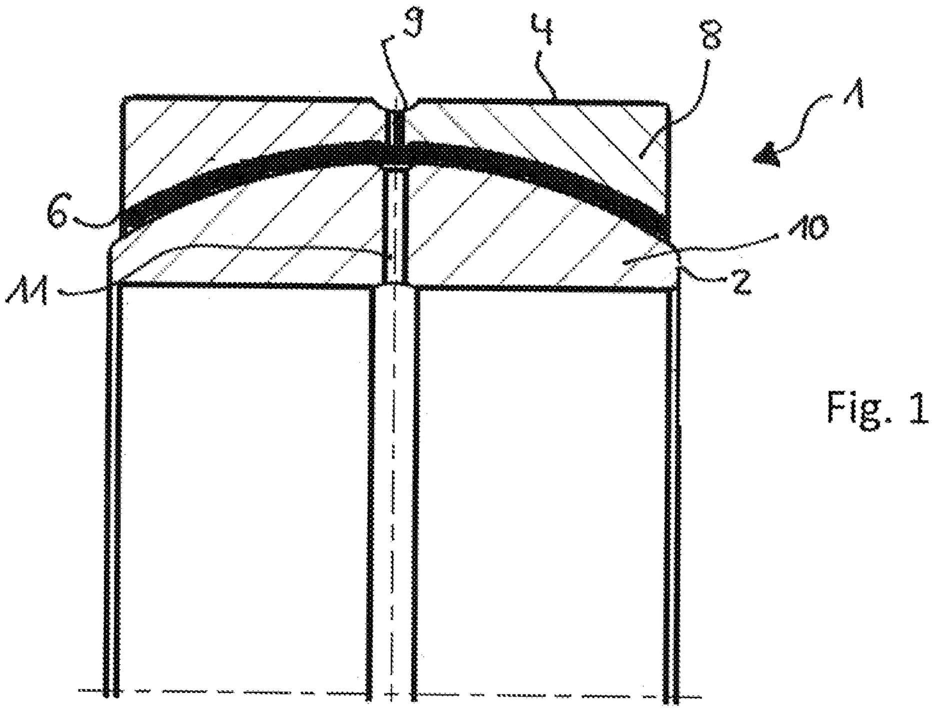
FIG. 1 is a schematic cross-sectional view of a plain bearing according to a first embodiment of the present disclosure.

FIG. 1 shows a plain bearing 1, which is formed of a plain bearing inner ring 2 and a plain bearing outer ring 4. The two plain bearing rings 2, 4 are each configured as single-piece rings. Alternatively, the plain bearing rings 2, 4 may also be configured as radially split rings or axially split rings. It should also be noted that a plain bearing 1 is described here by way of example. However, the plain bearing ring described here in conjunction with the plain bearing 1 can also be used in other applications, such as, for example, as a shaft or bushing, as is also defined above.

In order to provide a cost-effective, but at the same time efficient plain bearing 1, at least one of the plain bearing rings 2, 4 has a laser-clad sliding layer 6 (not drawn to scale) that forms a sliding surface of the at least one of the plain bearing rings 2, 4. The laser-clad layer 6 is preferably formed from a sliding material, such as, for example, a copper alloy, such as bronze or aluminium-bronze. As shown in FIG. 1, the laser-clad layer 6 is applied as a sliding layer on the sliding surface of the plain bearing outer ring 4.

In order, in addition to the required sliding property, also to provide a high load rating or load-bearing capacity of the plain bearing 1, the plain bearing outer ring 4 includes a base material 8 on which the sliding layer 6 is applied by means of laser cladding. The base material 8 is a metallic material, such as boron steel or rolling bearing steel, which permits a high load rating. In particular, the base material 8 has a higher elastic limit than the material of the laser-clad layer 6. Optional lubrication bores 9, 11 can be introduced into the base material 8, 10 of the plain bearing outer ring 4 and the plain bearing inner ring 2.

The sliding layer 6 is applied to this base material 8 as a thin laser-clad layer and provides the slidability of the plain bearing outer ring 4 required for the plain bearing 1. The combination of base material 8 with a high or higher elastic limit and sliding layer 6 made of sliding material makes it possible to maintain a high load rating with good sliding properties at the same time.

In contrast to previous plain bearings, in which the rings were formed exclusively of a sliding material, the combination of base material 8 with a high elastic limit (an elastic limit higher than the elastic limit of the base material) and a sliding layer 6 provides both a high load rating and the slidability required for sliding bearings. Furthermore, a good connection between the base material 8 and the sliding layer 6 is made possible by the deposition-welded sliding layer 6. Laser cladding permits a flat, stable and durable metal connection between the two materials and thus a long-lasting plain bearing 1.

Figure 2:
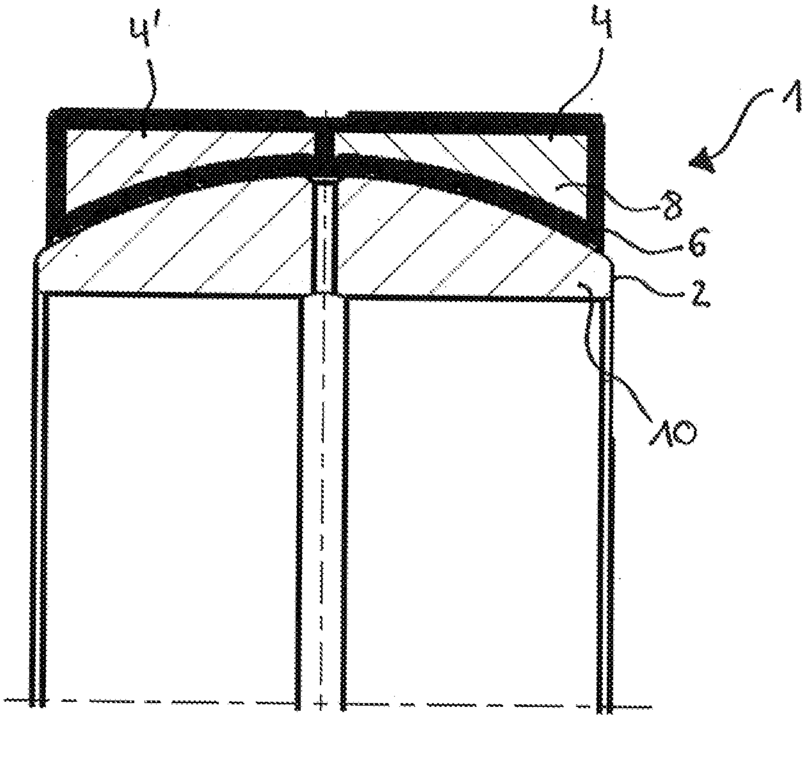
FIG. 2 is a schematic cross-sectional view of a plain bearing according to a second embodiment of the present disclosure.

In a further embodiment, which is shown in FIG. 2, the plain bearing outer ring 4, 4' may also be completely surrounded by the laser-clad layer 6. In the case of a split outer ring 4, 4' as is shown in FIG. 2, the laser-clad layer 6 is applied to both halves of the split outer ring 4, 4'. Since the plain bearing outer ring 4, 4' is completely surrounded by the laser-clad layer 6, this not only constitutes a sliding layer, but can also realize corrosion protection of the base material 8 in addition to the sliding property.

Figure 3:
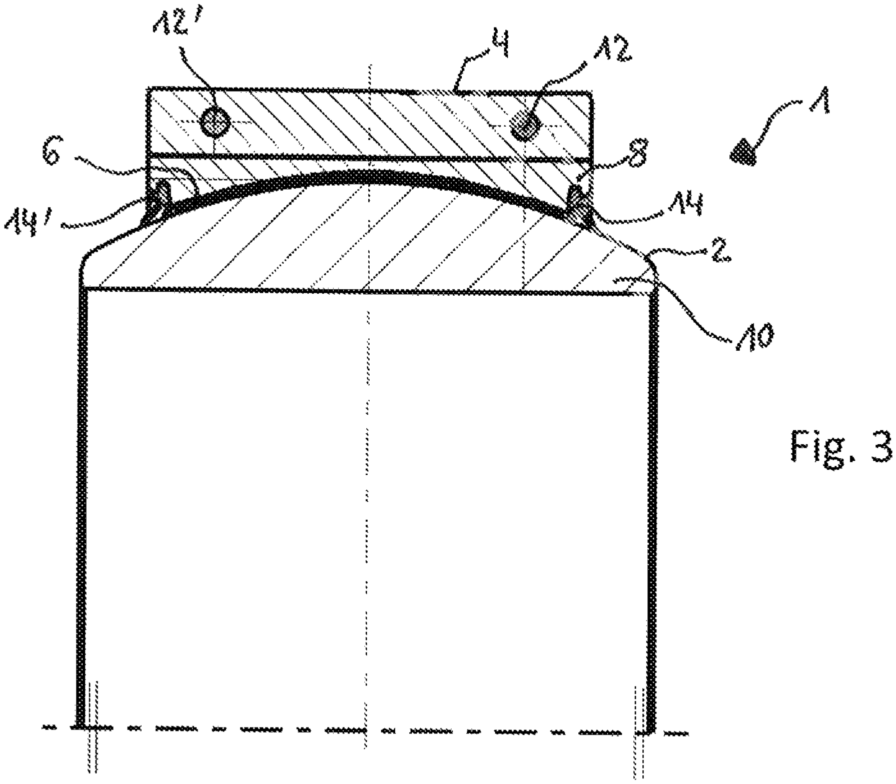
FIG. 3 is a schematic cross-sectional view of a plain bearing according to a third embodiment of the present disclosure.

Instead of a radially divided outer ring 4, 4', an axially divided outer ring 4 may also be provided with such a laser-clad layer 6, as is shown in FIG. 3. In this case, the plain bearing inner ring 2 is provided in the form of an undivided ring.

In the embodiment shown here, the laser-clad layer 6 in turn is applied only to the sliding surface of the plain bearing outer ring 4. Since the base material 8 of the plain bearing outer ring 4, 4' is a material with a high elastic limit (an elastic limit higher than that of the material of the laser-clad layer 6), the plain bearing outer ring 4, 4' can be connected with screw connections 12, 12'. Such screw connections 12, 12' would not be possible if the plain bearing outer ring 4, 4' is completely made of a sliding material, since the sliding material does not have sufficient strength to be able to securely attach such a screw connection.

As is shown in FIG. 3, the laser-clad layer 6 can be provided on the sliding surface of the plain bearing outer ring 4 between two seals 14, 14'. The sliding layer 6 can also extend beyond the seals 14, 14', or, as in FIG. 2, can surround the entire plain bearing outer ring 4, 4'.

Figure 4:
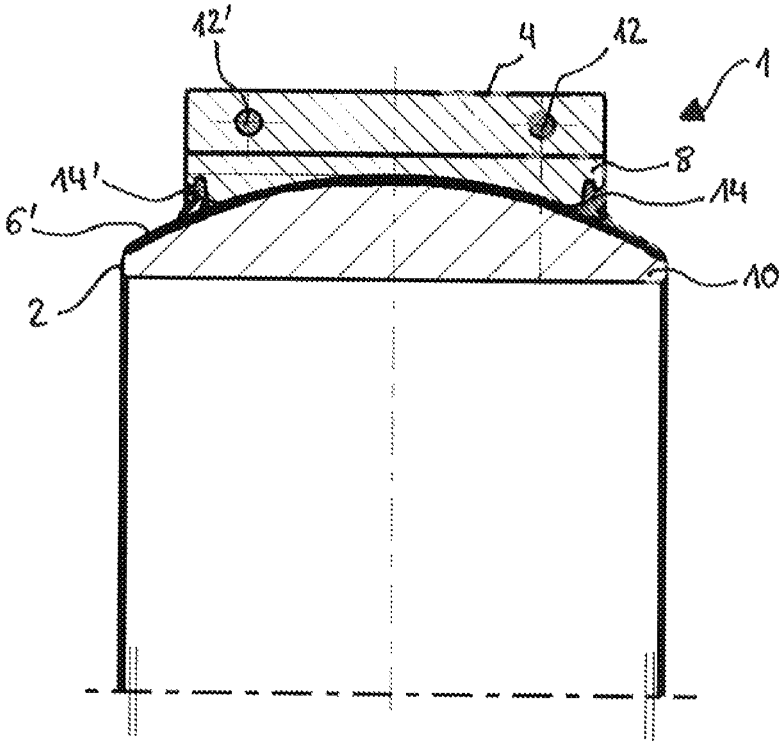
FIG. 4 is a schematic cross-sectional view of a plain bearing according to a fourth embodiment of the present disclosure.

Instead of applying the laser-clad layer 6 to the plain bearing outer ring 4, 4', it is also possible to provide the laser-clad layer 6 on the plain bearing inner ring 2, as is shown in FIG. 4. In this case, the plain bearing outer ring 4 may also be formed from a material with an elastic limit as high as or higher than the elastic limit of the material of the laser-clad layer 6 or from another standard material, and the plain bearing inner ring 2, like the plain bearing outer ring 4, 4' described above with reference to FIGS. 1-3, is provided with a laser-clad layer 6 as the sliding layer, which provides the required slidability. The base material 10 of the plain bearing inner ring 2 in turn is also formed from a material with a high or higher elastic limit, in order to enable the advantage of the combination of load rating and slidability.

The laser-clad layers or sliding layers 6 described above can be equipped with additional functionalities by introducing further fillers into the material of the laser-clad layer 6, which serve to reduce friction and/or wear. Furthermore, it should be noted that the embodiments shown above apply to both the plain bearing inner ring 2 and the plain bearing outer ring 4, 4' and are used in each case on at least one of the plain bearing rings 2, 2', 4, 4'. Alternatively, it is also possible to provide the laser-clad layer 6 both on the plain bearing inner ring 2 and on the plain bearing outer ring 4, 4', wherein the sliding layer 6 can be applied in each case only partially, in particular on the sliding surface, or completely around the respective ring.

By means of the above-described plain bearing or the described plain bearing rings, it is possible to provide a plain bearing ring, which can ensure a high load rating and at the same time shows no losses in terms of slidability.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved plain bearings.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMERAL LIST

1 plain bearing
2, 2' plain bearing inner ring
4, 4' plain bearing outer ring
6 deposition-welded layer
8 base material
9 lubrication groove
10 base material
11 lubrication bore
12, 12' screw connection
14, 14' seal

What is claimed is:

1. A plain bearing comprising:
a plain bearing first ring comprising a first metallic base material, and
a plain bearing second ring comprising a second metallic base material,
wherein all outer surfaces of the plain bearing first ring are covered by a first laser-clad layer, a first portion of the first laser-clad layer forming a first sliding surface of the plain bearing first ring,
wherein all outer surfaces of the plain bearing second ring are covered by a second laser-clad layer, a first portion of the second laser-clad layer forming a second sliding surface of the plain bearing second ring,
wherein the first metallic base material has a higher elastic limit than a material of the first laser-clad layer and the second metallic base material has a higher elastic limit than a material of the second laser-clad layer, and
wherein the first sliding surface is configured to slide against the second sliding surface.

2. The plain bearing according to claim 1,
wherein the first metallic base material comprises 27MnCrB5-2 and 33MnCrB5-2 in accordance with EN ISO 683-2:2016.

3. The plain bearing according to claim 2,
wherein the second metallic base material comprises 27MnCrB5-2 and 33MnCrB5-2 in accordance with EN ISO 683-2:2016.

4. The plain bearing according to claim 3,
wherein the first laser-clad layer comprises aluminum-bronze or copper-nickel-tin.

5. The plain bearing according to claim 4,
wherein a thickness of the first laser-clad layer is less than or equal to 10 mm.

6. The plain bearing according to claim 4,
wherein the first laser-clad layer comprises a plurality of layers or aluminum-bronze or a plurality of layers of copper-nickel-tin.

7. The plain bearing according to claim 4,
wherein the plain bearing first ring is a split radially outer ring.

8. A plain bearing comprising:
a plain bearing first ring comprising a first metallic base material, the first metallic base material comprising 27MnCrB5-2 and 33MnCrB5-2 in accordance with En ISO 683-2:2016, and
a plain bearing second ring comprising a second metallic base material,
wherein a first portion of the plain bearing first ring is covered by a first laser-clad layer to form a first sliding surface of the plain bearing first ring,
wherein a first portion of the plain bearing second ring is covered by a second laser-clad layer to form a second sliding surface of the plain bearing second ring,
wherein the first metallic base material has a higher elastic limit than a material of the first laser-clad layer and the second metallic base material has a higher elastic limit than a material of the second laser-clad layer, and
wherein the first sliding surface is configured to slide against the second sliding surface.

9. The plain bearing according to claim 8,
wherein the first laser-clad layer comprises aluminum-bronze or copper-nickel-tin.

10. The plain bearing according to claim 9,
wherein a thickness of the first laser-clad layer is less than or equal to 10 mm.

11. The plain bearing according to claim 9, wherein the first laser-clad layer comprises a plurality of layers of aluminum-bronze or a plurality of layers of copper-nickel-tin.

12. The plain bearing according to claim 8, wherein the plain bearing first ring is a split radially outer ring.

13. A method of forming a plain bearing comprising:

laser cladding all outer surfaces of a plain bearing first ring to form a first laser-clad layer, the first plain bearing first ring comprising a first metallic base material, and laser cladding all outer surfaces of a plain bearing second ring to form a second laser-clad layer, the plain bearing second ring comprising a second metallic base material, wherein a first portion of the first laser-clad layer forms a first sliding surface of the plain bearing first ring, wherein a first portion of the second laser-clad layer forms a second sliding surface of the plain bearing second ring, wherein the first metallic base material has a higher elastic limit than a material of the first laser-clad layer and the second metallic base material has a higher elastic limit than a material of the second laser-clad layer, and mounting the plain bearing first ring to the plain bearing second ring with the first sliding surface slidingly supported by the second sliding surface.

14. The method according to claim 13, wherein the first metallic base material comprises 27MnCrB5-2 and 33MnCrB5-2 in accordance with EN ISO 683-2:2016.

15. The method according to claim 14, wherein the second metallic base material comprises 27MnCrB5-2 and 33MnCrB5-2 in accordance with EN ISO 683-2:2016.

16. The method according to claim 15, wherein the first laser-clad layer comprises aluminum-bronze or copper-nickel-tin.

17. The method according to claim 16, wherein laser cladding all outer surfaces of the plain bearing first ring comprises melting a portion of the first metallic base material and melting a portion of the aluminum-bronze or copper-nickel-tin.

18. The method according to claim 13, wherein laser cladding all outer surfaces of the plain bearing first ring comprises melting a portion of the first metallic base material.

* * * * *